United States Patent
Benlloch Baviera et al.

(10) Patent No.: US 10,228,471 B2
(45) Date of Patent: Mar. 12, 2019

(54) HYBRID SCINTILLATION MODULE

(71) Applicants: General Equipment for Medical Imaging S.A., Valencia (ES); West Virginia University, Morgantown, WV (US); Consejo Superior de Investigaciones Cientificas (CSIC), Madrid (ES); Universitat Politecnica de Valencia, Valencia (ES); BRUKER BIOSPIN AG, Fallanden OT (CH)

(72) Inventors: Jose Maria Benlloch Baviera, Valencia (ES); Antonio Javier Gonzalez Martinez, Valencia (ES); Stan Majewski, Charlottesville, VA (US)

(73) Assignees: General Equipment for Medical Imaging S.A., Valencia (ES); West Virginia University, Morgantown, WV (US); Consejo Superior de Investigaciones Cientificas (CSIC), Madrid (ES); Universitat Politecnica de Valencia, Valencia (ES); Bruker BioSpin AG, Fallanden (CH)

( * ) Notice: Subject to any disclaimer, the term of this patent is extended or adjusted under 35 U.S.C. 154(b) by 0 days.

(21) Appl. No.: 15/586,908

(22) Filed: May 4, 2017

(65) Prior Publication Data
US 2017/0234991 A1 Aug. 17, 2017

Related U.S. Application Data

(63) Continuation of application No. PCT/EP2015/075916, filed on Nov. 6, 2015.

(30) Foreign Application Priority Data

Nov. 6, 2014 (EP) .................................... 14382440

(51) Int. Cl.
G01T 1/20 (2006.01)
G01T 1/29 (2006.01)
G01T 1/164 (2006.01)

(52) U.S. Cl.
CPC .......... G01T 1/1644 (2013.01); G01T 1/1642 (2013.01); G01T 1/2008 (2013.01); G01T 1/2018 (2013.01); G01T 1/2985 (2013.01)

(58) Field of Classification Search
CPC .................................................. G01T 1/1644
See application file for complete search history.

(56) References Cited

U.S. PATENT DOCUMENTS 3,978,336 A 8/1976 Roux
5,861,628 A * 1/1999 Genna .................. G01T 1/1642
250/366

(Continued)

FOREIGN PATENT DOCUMENTS

CN 102707310 6/2014
WO WO 2013189188 A1 * 12/2013 ........... A61B 6/4258

OTHER PUBLICATIONS

International Search Report for corresponding PCT Application No. PCT/EP2015/075916 dated Jan. 22, 2016.

(Continued)

*Primary Examiner* — David P Porta
*Assistant Examiner* — Jeremy S Valentiner
(74) *Attorney, Agent, or Firm* — Caesar Rivise, PC

(57) ABSTRACT

This disclosure describes an imaging radiation detection module with novel configuration of the scintillator sensor allowing for simultaneous optimization of the two key parameters: detection efficiency and spatial resolution, that typically cannot be achieved. The disclosed device is also improving response uniformity across the whole detector module, and especially in the edge regions. This is achieved (Continued)

by constructing the scintillation modules as hybrid structures with continuous (also referred to as monolithic) scintillator plate(s) and pixelated scintillator array(s) that are optically coupled to each other and to the photodetector. There are two basic embodiments of the novel hybrid structure: (1) the monolithic scintillator plate is at the entrance for the incoming radiation, preferably gamma rays, and the pixelated array placed behind the plate, all in optical contact with the photodetector, (2) the order of the scintillator components is reversed with the pixelated scintillation plate placed in front of the monolithic plate.

21 Claims, 8 Drawing Sheets

(56) References Cited

U.S. PATENT DOCUMENTS

| | | | |
|---|---|---|---|
| 6,713,767 B2 | 3/2004 | Wieczorek et al. | |
| 6,819,738 B2 | 11/2004 | Hoffman | |
| 6,946,841 B2 | 9/2005 | Rubashow | |
| 7,692,156 B1* | 4/2010 | Nagarkar | G01T 1/1644 250/361 R |
| 2009/0072156 A1* | 3/2009 | Chinn | G01T 1/2985 250/363.04 |
| 2009/0134334 A1* | 5/2009 | Nelson | G01T 1/2002 250/361 R |
| 2013/0015360 A1* | 1/2013 | Kobayashi | G01T 1/202 250/366 |
| 2014/0091223 A1* | 4/2014 | Menge | G01T 1/1644 250/366 |
| 2015/0323684 A1* | 11/2015 | Xie | A61B 6/4258 250/486.1 |
| 2015/0378035 A1* | 12/2015 | Choi | A61B 6/037 250/363.03 |
| 2017/0212251 A1* | 7/2017 | Hadjioannou | G01T 1/2985 |

OTHER PUBLICATIONS

Levin, "New Imaging Technologies to Enhance the Molecular Sensitivity of Positron Emission Tomography", Proceedings of the IEEE, vol. 96, No. 3, pp. 439-467, 2008.

Ito et al., "Positron Emission Tomography (PET) Detectors With Depth-of-Interaction (DOI) Capability", Biomedical Engineering Letters, vol. 1, pp. 70-81. 2011.

Lee, "Technical Advances in Current PET and Hybrid Imaging Systems", The Open Nuclear Medicine Journal, vol. 2, pp. 192-208, 2010.

Lewellen, "The Challenge of Detector Designs for PET", American Journal of Roentgenology, vol. 195, No. 2. pp. 301-309, 2010.

Peng et al., "Recent Developments in PET Instrumentation", Current Pharmaceutical Biotechnology, vol. 11, pp. 555-571, 2010.

Lee, Jae Sung, "Technical Advances in Current PET and Hybrid Imaging Systems", The Open Nuclear Medicine Journal, vol. 2, 2010, pp. 192-208.

Schmand et al., "Performance Results of a New DOI Detector Block for a High Resolution PET-LSO Research Tomograph HRRT", IEEE Nuclear Science Symposium, Nov. 9-15, 1997. Abstract.

* cited by examiner

HYBRID SCINTILLATION MODULE

FIELD OF INVENTION

Primarily this invention relates to the implementation of enhanced scintillation detectors in nuclear medicine imaging. It is specifically related to the special construction and method of coupling of scintillation crystals to photodetectors to provide highly accurate determination of the 3D conversion position of the impinging high energy radiation, preferably, gamma photons. Using this concept in Positron Emission Tomography (PET) imaging will result in high 3D spatial resolution tomographic system with high efficiency and moderate cost.

However it is to be understood that the present invention is also applicable in many other technical fields, as for example in astrophysics, radiation safety or homeland security.

BACKGROUND OF INVENTION

A wide range of technical solutions was proposed in the past for achieving high three-dimensional spatial resolution in imaging radiation detectors, preferably gamma detectors, while assuring high detection efficiency. Achieving high resolution in Single Photon Computerized Tomography (SPECT) when using pinhole collimators or in coincidence Positron Emission Tomography (PET) detectors, requires not only high standard resolution in the plane of the detector module but also accurate information on the depth-of-interaction (DOI) of the converting photons inside the active material such as crystal scintillator. Common aspect of these both situations (pinhole SPECT and PET) is that there are many inclined radiation trajectories involved and to achieve high resolution operation, the information on the third—depth—coordinate of the point inside the scintillator module where the radiation, preferably gamma ray, interacted/converted, is necessary. Many technical approaches were developed in the past to achieve high DOI resolution and are for example described in the referenced review papers [1-5]. In the current invention, we propose a hybrid scintillator configuration for the scintillation crystals forming the scintillation detection block.

Most scintillating crystal blocks for high spatial resolution detectors, preferably gamma ray detectors, such as the ones used in small animal PET scanners, use a configuration based on crystal pixel arrays (for example Naviscan's breast PET imager, Siemens microPET and INVEON small animal scanners, LabPET small animal PET from TriFoil imaging, etc). A new recent design based on continuous (also known as monolithic) crystal slabs has also shown excellent position resolution (Oncovision's MAMMI PET breast imager and ALBIRA small animal PET imager, University of Washington research effort, and Delft University in Holland research project). However, both pixelated and monolithic configurations present important limitations for thick (around 15 mm or more in the PET detector) crystal blocks, required for stopping (and hence detecting) with high efficiency the high energy annihilation 511 keV photons emitted by the PET radioisotopes. Crystal pixel arrays do not offer DOI information and when the pixels are very thin and long they provide poor energy and timing resolution and are costly to manufacture. Monolithic crystal slabs show poor spatial resolution at the edges and near the entrance surface when using thick crystals.

Therefore, there are important drawbacks in the current technology: to solve these problems, in particular the conflict between the thickness-dependent detection efficiency of the monolithic crystal and the poor energy and timing resolution of the crystal pixel arrays, in this invention, we propose a hybrid configuration in which the scintillation block is a hybrid scintillation module formed by a component (or multiple components) of crystal pixel arrays coupled to a component (or multiple components) of a continuous crystal slab (or several slabs). Such hybrid configuration overcomes the mentioned limitations by providing high stopping power (the stopping power can be defined as the probability for the incoming radiation to deposit most of its energy in the target material (dE/dx) with high 3D resolution of the conversion position of the radiation, preferably gamma ray, inside the whole crystal block, and with good energy and timing resolutions, at the same time.

It is important to clarify that the term "hybrid detector" was also used in the past in other contexts. In an example of one such use of the term "hybrid" (U.S. Pat. No. 6,819,738: "Hybrid scintillator/photo sensor & direct conversion detector") it describes the combination of two or more different radiation detection modality systems into one combined CT system. Other examples are PET/CT or PET/MRI imager combinations where two modalities operate as one system. Another use of the "hybrid" term is given to the radiation sensor that functions as two types of modalities, for example to detect gamma and X-ray radiation and produce emission (gamma) and transmission (X-ray) images with the same radiation sensor.

U.S. Pat. No. 6,946,841-B2 discloses an apparatus for combined nuclear imaging and magnetic resonance imaging, and method thereof. A combined MR and nuclear imaging device comprising an MRI device and a nuclear imaging device, wherein the nuclear imaging device is capable of operating with the magnetic field of the MRI device or in a region where the magnitude of the magnetic field is lower. The combined system allows MRI examination and nuclear medicine examinations to be conducted quasi-simultaneously with no, or minimal, motion of the patient during the combined examination. The nuclear imaging device comprises nuclear detector modules capable of operating within a large magnetic field in the bore of the MRI scanner when the modules are oriented in the direction of the field, and are capable of operating in any direction when the magnitude of the field is below a certain threshold.

Other efforts listed below refer to the crystal treatment and coupling methods. U.S. Pat. No. 6,713,767-B2: "Hybrid two-dimensional scintillator arrangement" describes a scintillator arrangement comprising: a plurality of detector strips comprising a plurality of scintillator slabs, the scintillator slabs being separated from one another by absorber layers; and a fitting form wherein at least two of said plurality of detector strips are arranged essentially parallel to one another in said fitting form and wherein the fitting form comprises transverse pieces and a frame, the transverse pieces being arranged essentially parallel to one another and being attached to opposite sides of the frame. In our invention there are not absorbers in between the scintillators: the light is transferred from one slab to another. That design is only addressing the issue of two dimensional and not three dimensional arrangement. The absorber layers disclosed in U.S. Pat. No. 6,713,767 introduce asymmetry in the transversal light propagation and would decrease the performance in case they would be used in our structure. Except for the name, these two structures are entirely different.

U.S. Pat. No. 3,978,336-A discloses a hybrid scintillation scanning apparatus" that comprises: a scintillation crystal bar of elongated form receiving the gamma radiation through a collimator and comprising a transparent upper face optically coupled by means of a light guide to a plurality of photomultipliers. The photomultipliers furnish their signals to an electronic combining circuit supplying, on one hand, an amplitude analyzer and, on the other hand, a computing circuit permitting the location of the scintillation along the axis of the bar. The scanning apparatus disclosed in this patent does not include a combination of scintillation modules: one continue scintillation module and one pixelated scintillation module as the present invention does. It is therefore a completely different object.

U.S. Pat. No. 7,692,156-B1 "Beam-oriented pixelated scintillators for radiation imaging" discloses a radiation detection device, comprising: a two-dimensional, beam-oriented pixelated scintillator, the scintillator having a first pixel having a first pixel axis and a second pixel having a second pixel axis, wherein the first and second axes are at an angle relative to each other, and wherein each axis is substantially parallel to a predetermined beam direction for illuminating the corresponding pixel. According to particular embodiments, the device of U.S. Pat. No. 7,692,156-B1 the scintillator comprises inter-pixel grooves and the pixels have a two dimensional monolithic array. This is entirely different from the two component scintillation module of the present invention. We are not using inter-pixel groves.

CN102707310 discloses a device wherein "the scintillation crystal array are built by strip-type scintillation crystals arranged along width and length directions" However, in addition to other advantages, there is an essential difference between the hybrid scintillation module of claim 1 of the present application, wherein the multiplicity of scintillators of the scintillation array are pixelated, whereas according to D1 the scintillation crystals are "strip-type".

Pixels and strips are completely different technical terms: pixels are two-dimensional, whereas strips are one-dimensional (of course they have width and length as parameters but due to their shape the operational extraction of spatial information is different). Pixels can be interconnected in readout strips, but when starting with strips some spatial information is irreversibly already lost.

Meaning of Some Terms and Expressions Used in this Application

The expressions "monolithic crystals", "monolithic scintillation slab", "monolithic scintillation plate", "continuous crystal slab", "continuous scintillation plate", "continuous scintillator plate" and monolithic scintillator are used indistinctly along this specification.

The expressions "pixelated scintillator array", "pixelated scintillation array", and "pixelated scintillation plate" are used interchangeably.

In this application the expression "scintillation module", "scintillator module", and "scintillation block" are used interchangeably.

DESCRIPTION OF INVENTION

The objective technical problem to be solved is to provide an efficient method to build high resolution scintillation modules that also provide high stopping power to the incoming radiation, preferably gamma radiation, and to achieve it in an economical manner.

This invention describes an apparatus to detect radiation, preferably gamma rays, based on a hybrid scintillation module or block composed of a combination of continuous (also referred as monolithic) scintillator plate(s) and pixelated scintillator array(s) coupled to a photodetector. The method of coupling the two scintillator module components produces several important advantages when properly executed.

The present invention therefore refers to a hybrid scintillation module for the detection of radiation, preferably gamma radiation, characterized in that it it comprises a combination of:
  at least a first pixelated scintillation array with a multiplicity of scintillators, and
  at least a first monolithic scintillation plate.

The present invention also refers to a hybrid scintillation device that comprises a hybrid scintillation module as defined and at least a photodetector.

Optionally, the hybrid scintillation module of the invention further comprises a light spreader window also called light guide.

According to particular embodiments, this spreader window or light guide can be located between the monolithic scintillation component and the photodetector(s), or according to additional particular embodiments it can be located between pixelated scintillation array and the photodetector(s).

Optionally an additional imaging light guide can be placed between the scintillation block and a light spreader window (also called light guide).

Optionally, the hybrid scintillation module of the invention further comprises at least a refractive optical coupling compound provided between the pixelated and monolithic scintillators and the photodetector(s). The refractive optical coupling compound is an optical transmitting compound with high refractive index n ($1.4<n<1.8$). According to particular embodiments, the optical coupling compound can be located between the scintillators, spreader window, the optional imaging light guide and the photodetector(s).

According to particular embodiments of the present invention the hybrid scintillation module, it can comprise several pixelated scintillation arrays, each of them with a multiplicity of scintillators.

According to additional particular embodiments of the present invention the hybrid scintillation module can comprise several monolithic scintillation plates, each of them with a multiplicity of scintillators.

A preferred embodiment refers to a hybrid scintillation module with a two-component scintillator module, one of each kind (one pixelated and one monolithic). With this arrangement the stopping power of the scintillation module is increased while optimizing the spatial resolution performance.

A first main preferred embodiment refers to a hybrid scintillation module wherein the pixelated scintillation array is at the front and the monolithic scintillation plate is behind the pixelated scintillation array. In other words, the pixelated scintillation array is placed upfront facing the incident radiation, preferably gamma ray beam and, thus, on top of the monolithic plate with the photodetector on the other side of the monolithic plate, and receiving scintillation light from both components (the pixelated scintillation array and the monolithic plate) of the scintillator module. Often, the monolithic scintillator plate(s) has/have a trapezoidal shape with side walls angled inside towards the top. Other than square base polygonal shapes such as triangular, hexagonal, etc, are also possible.

A second main preferred embodiment refers to a hybrid scintillation module wherein the order of the two scintillators is reversed: the monolithic plate is at the front and the pixelated scintillation array is behind the monolithic plate. In other words, the hybrid scintillator module configuration has the monolithic scintillator plate at the entrance and the pixelated array placed behind the plate in optical contact, or optically coupled, with the photodetector. Optionally, the monolithic scintillator plate(s) has/have a trapezoidal shape. Other than square base polygonal shapes such as triangular, hexagonal etc are also possible.

According to this second main embodiment the system allows application of the monolithic component having optimal thickness from the performance point of view, while increasing stopping power of the photons, preferably gamma photons, by the detection module. This arrangement also provides good spatial resolution performance, including depth of interaction (DOI), for the major fraction of the stopped radiation, preferably gamma rays, in the scintillator. In both main embodiments the high refractive optical coupling compound, if present, is applied between the scintillators, the light guide(s) (if used) and the photodetector.

Discussing in more detail the second embodiment of the invention, the front component facing the incoming radiation, preferably gamma rays, is the monolithic scintillator plate, while the second scintillation component coupled to the photodetector, is made out of a pixelated scintillation array. Both components are optically coupled. The scintillation light generated in the monolithic plate scintillator goes through the pixelated scintillation array on a way to the photodetector. Therefore the pixelated scintillation array functions in this case as the fiberoptic light guide providing optical containment of the scintillation light cone coming out of the plate scintillator and hence limiting the edge effects typically present when using plate scintillators due to broad scintillation light spread. The scintillation light spot size is preserved while being transported to the photodetector array.

In addition, the pixelated scintillator array acts as the additional active component in the hybrid scintillator module that increases the sensitivity of the detector. The transmitted light generated in the monolithic plate scintillator as well as the scintillation light generated in the pixelated scintillation array are impinging onto the photodetector surface through a coupling light guide optimized for proper scintillation light distribution and sampling in the position sensitive photodetector. Typically the photodetector is built from an array of smaller sensors/pads rather than having a continued active surface.

A practical example of such a hybrid structure is a 10 mm thick LYSO (cerium-doped lutetium yttrium orthosilicate) plate coupled to a matching size array of 1.5 mm pitch 10 mm long LYSO pixels, subsequently coupled through a spreader light guide/window to an array of 3 mm Silicon Photomultiplier sensors (SiPMs) distributed with a 3.1-4.0 mm pitch.

For any embodiment of the hybrid scintillation module of the invention the monolithic scintillation plate may be split into at least two stacked layers.

For any embodiment of the hybrid scintillation module of the invention the pixelated scintillation plate may be split into at least two stacked layers.

Additional particular embodiments refer to a hybrid scintillation module comprising pixelated scintillation arrays arranged as a stack of at least two shifted arrays, preferably on top of each other.

For any embodiment of the hybrid scintillation module of the invention the two (or more) scintillation components—the monolithic scintillation plate(s) and the pixelated scintillation array(s)—can be made of the same scintillation material or can be made of different scintillation materials. For instance LYSO or GSO (gadolinium orthosilicate $Gd_2SiO_5$:Ce) or BGO (bismuth germanate $Bi_4Ge_3O_{12}$) could be used. In the case of different scintillation materials care must be taken to assure that the materials placed between the top scintillator components and the photodetector do not absorb the scintillation light from the top layer. As well the light guide and optical coupling compounds, such as acrylic or glass plates with thicknesses varying from 0.1 to 10 mm, must be transmitting the scintillation light to the photodetector without significant losses. Preferred range for the window thickness is 1-4 mm.

When the monolithic scintillation plate(s) and the pixelated scintillation array(s) are made of different scintillation materials they may have different light time properties (rise time and/or fall/decay time constants of their scintillators). This feature, if the rise time and/or decay times differences for the scintillation materials are large enough, can provide another complementary method to distinguish the two scintillator components. Additional readout electronics channels may be necessary to provide this additional analysis of the time shape of the scintillation pulses.

The hybrid scintillation module of the invention can further comprise hardware and software means for extracting 3D information on the position of the radiation, preferably gamma, conversion event from the planar 2D distribution of the scintillation light cone at the photodetector surface. Said means are in a particular embodiment a 3D spatial calculation algorithm that extracts the 3D information on the position of the radiation, preferably gamma, conversion event from the planar 2D distribution of the scintillation light cone at the photodetector surface. The set of individual readout channels from the photodetector measures the scintillation light distribution emerging from the scintillation module and based on this calculates the position in 3D of the scintillation light source inside the scintillation module. The software algorithm employs mathematical analysis of the measured light distribution to extract the originating position of the scintillation light. There are different algorithms that can be implemented but the preferred one is the one using the physical modelling (simulation) of the scintillation light generation and progression through the scintillation module on the way to the photodetector, and comparing the simulation results with the actual experimentally measured spatial distribution. After the repeated (iterative) simulation, the results converge with the experimental distribution, and the calculated or estimated position in 3D is extracted from the best fit. This calculation is done on the scintillation detected photons on an event by event basis. It requires very fast computing system. The method works best for the monolithic plates because monolithic scintillators inherently provide information of the 3-D impact coordinates of the photon interactions. The detected light is fitted to a theoretical expression based on the optics of scintillation light propagation in the scintillator. An example of algorithm is an optimization of the Levenberg-Marquardt method implemented in the open source numerical analysis and data processing library ALGLIB (www.alglib.net).

According to particular embodiments of the hybrid scintillation module, it comprises a pixelated scintillation array in front of a monolithic scintillation plate, wherein the thickness of the pixelated scintillation array is lower than the thickness of the monolithic scintillation plate. In other word, the hybrid module of the invention may use the dual "high resolution/full resolution" concept by utilizing thin pixelated array in front of the thicker plate scintillator. In this way three images are produced: high resolution part of the imager only that produces a high resolution image, moderate resolution part of the imager only producing a moderate resolution image, and finally the full system resolution by combining the two above mentioned parts of the detector and producing a full resolution image.

The hybrid scintillation device of the invention can further comprise a fiberoptic light guide inserted in front of the photodetector to transport light further away from the scintillator before coupling it to the photodetector.

According to additional particular embodiments or the hybrid scintillation module, it can further comprise an optically transmitting radiofrequency (RF) shield layer, or layers, inserted between the fiberoptic lightguide and the scintillator module to improve the RF shielding between the detector modules and the MRI scanner RF fields due to its electromagnetic properties, making the modules MR-compatible and allowing the construction of the PET/MR (Positron Emission Tomography (PET) Magnetic Resonance) dual-modality imager.

Scintillation Surface Treatment

The pixelated scintillation arrays need proper surface treatments to operate in an optimal way. The surface treatment of the scintillators and especially of the pixelated scintillation array needs to be optimized as it has large effect on the scintillation module performance.

A very important and non-standard novel concept disclosed here and demonstrated already in the "reduction to practice" comparative experiments, is that when the side surfaces of the scintillation pixels in the pixelated scintillation array are rough-cut ("as-cut") and not polished, especially when scintillation array is placed on top of the monolithic scintillation plate, the detector operation is better: higher detected scintillation signal and better scintillation pixel separation in the images. The explanation is that the scintillation light cone exiting from the pixels and then propagating across the monolithic scintillator gap on a way to the photodetector is wider for the "as-cut" side surface treatment as compared to the polished surface treatment The cone opening angle is made wider when the scintillation photon bunch is propagating through the scintillation pixel and bouncing multiple times off the pixel side walls with rougher treatment as scintillation photons undergo wider angle scattering, while in the polished pixel case the photon propagation is governed by the total internal light reflection process, producing narrower and defined by the refractive index angle limits. Wider cone produces larger scintillation light imprint on the surface of the photodetector and subsequently allows for finer scintillation light signal sampling with the fixed-pitch photodetector and as a result produces better definition of the centre of gravity of the light distribution. By this, the achieved separation of the scintillation pixels is greatly improved in the rough surface treatment case. In fact our experimental evidence is that while in some tested cases where the only difference was the side surface treatment (same pixel pitch and size, same lightguide, same photodetector, etc) the standard polished variant provided poor pixel separation while with the "as-cut" variant the pixel separation as well as energy resolution were excellent.

Preferred embodiments are disclosed in the dependent claims. Some of these claims cover the particular conditions that need to be met for the hybrid scintillator concept to operate optimally.

An invention according to claim 2 has the following key advantages:

allows application of two and more scintillation components and increasing stopping power and detection efficiency of the whole module, while not decreasing spatial resolution; the individual components have typical thicknesses of 5-15 mm each (in the case of the LYSO scintillator); in a typical arrangement, preferred also from the cost point of view, both components will be 10 mm thick.

enables a "high resolution/full resolution" dual operation mode approach through application of thinner (app. <=5 mm) pixelated front component that provides very high upfront 2D spatial resolution performance, for a substantial fraction (30-60%) of the total detected annihilation photons by the module; using only this detector component will produce separate high resolution images albeit with lower efficiency, to improve DOI resolution of the pixelated component it can be split into two or more sub-layers and separated on the basis of relative spatial (x-y) shifts and/or by scintillation light characteristics (for example by using two or more different scintillator materials with different time shapes of the scintillation pulses that can be recorded), the monolithic component will provide additional stopping power with a coarser but sufficient 2D spatial resolution and with good Depth-of-Interaction (DOI) resolution;

using additive image processing algorithm, a combination of the previously obtained high resolution images and of the moderate resolution images coming from the coarser resolution component of the detector will produce full efficiency images, however with the high resolution component of the reconstructed images dominating detection of the hot features, such as small structures or lesions. The added system sensitivity due to the additional stopping power of the second scintillation component albeit with lower spatial resolution— is increasing the statistical strength of the detected signal in the form of increased Signal-to-Noise (S/N) ratio and higher "contrast values". Contrast is defined as the relative difference in counts per image pixel or difference in intensity between two points in an image. "Contrast resolution" is defined as the ability to distinguish between areas in an image (such as different tissues) due to the difference in count densities of the two areas.

A hybrid scintillation module according to claim 3 has the following key advantages:

allows application of the economical yet high performing monolithic component having optimal thickness (on the order of 50% of the total thickness), while increasing stopping power of the whole module, through application of the monolithic front component it provides high upfront 3D spatial resolution performance, including DOI, for the major fraction of the detected events by the imager, the pixelated second component placed behind the monolithic component provides additional stopping power with high 2D spatial resolution and coarser but sufficient in many imaging tasks DOI resolution;

to improve DOI resolution of the pixelated component it can be split into two or more sub-layers and separated on the basis of relative spatial (x-y) shifts and/or by scintillation light characteristics (for example by using two or more different scintillator materials).

An advantage of the hybrid scintillation module of the present invention is that it improves the spatial resolution and response uniformity across the whole detector module, and especially in the edge regions, while maintaining high efficiency and energy resolution across the module.

The present invention further refers to the hybrid scintillation module defined herein or the device comprising said hybrid scintillation module in nuclear medicine imaging, preferably Single-Photon Emission Computed Tomography, SPECT, or Positron Emission Tomography, PET.

Another object of the invention is a method of use of the hybrid scintillation module defined above for obtaining images, or the device comprising the hybrid scintillation module defined above for obtaining images.

According to particular embodiments, the hybrid scintillation module defined or the device defined above are used to build a gamma or PET detector built out of one to many such hybrid scintillation modules to obtain radiation emission images from an emitting object, the modules operating as single units or sets of single units, and being arranged in a ring(s) or in planar arrays.

According to particular embodiments the use comprises:
using a hybrid scintillation module with a pixelated scintillation array in front of a monolithic scintillation plate, wherein the thickness of the pixelated scintillation array is lower than the thickness of the monolithic scintillation plate and
producing three images as follows: one image corresponding to a high resolution detector that produces a high resolution image (only pixelated front arrays in tomographic reconstruction), a moderate resolution image produced by a moderate resolution detector only (using the monolithic components in the tomographic reconstruction), and a full resolution image produced by the full module resolution by combining the two components by combining the two detector components in the tomographic reconstruction

LIST OF REFERENCES SHOWN IN THE FIGURES WITH COMMENTS

Figure 3:
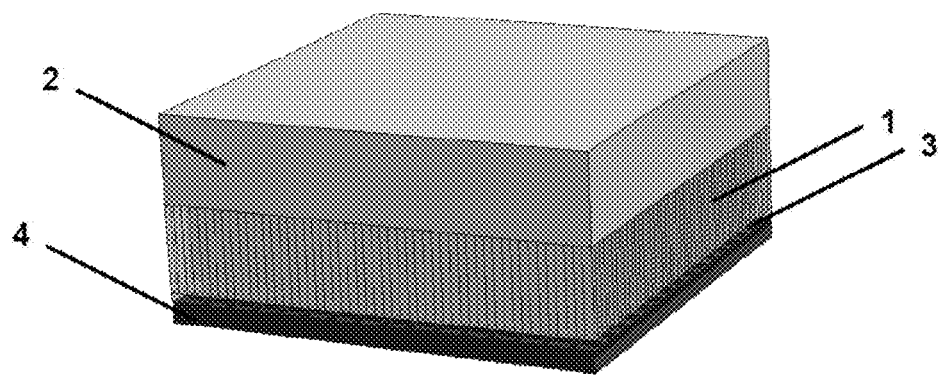
FIG. 3: The second preferred embodiment of the hybrid scintillator module with reversed order of the pixelated and monolithic components: the monolithic scintillator plate is at the entrance and the pixelated array placed behind the plate in optical contact with the photodetector.
Figure 4:
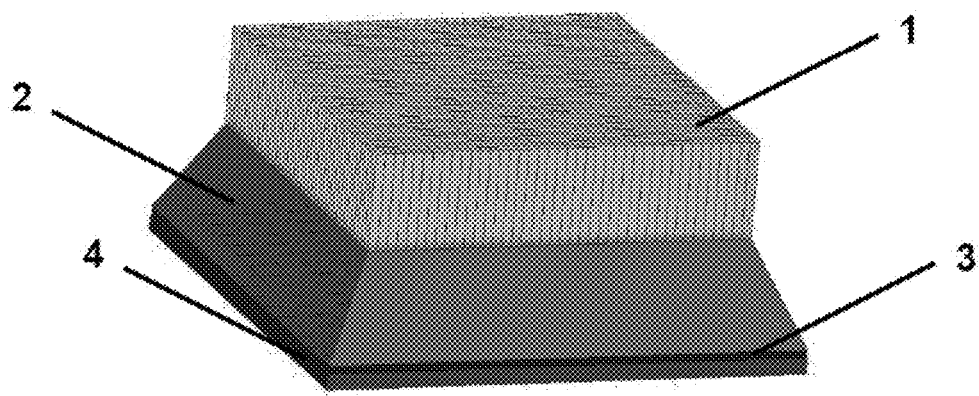
FIG. 4: A variant of the first preferred embodiment of the hybrid scintillator module with a tapered monolithic scintillator.
Figure 5:
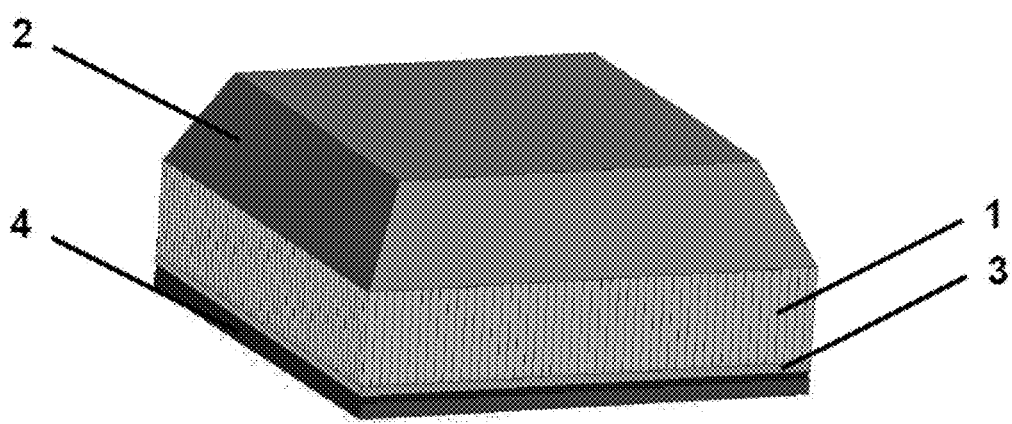
FIG. 5: A variant of the second preferred embodiment of the hybrid scintillator module with a tapered monolithic scintillator.
Figure 6:
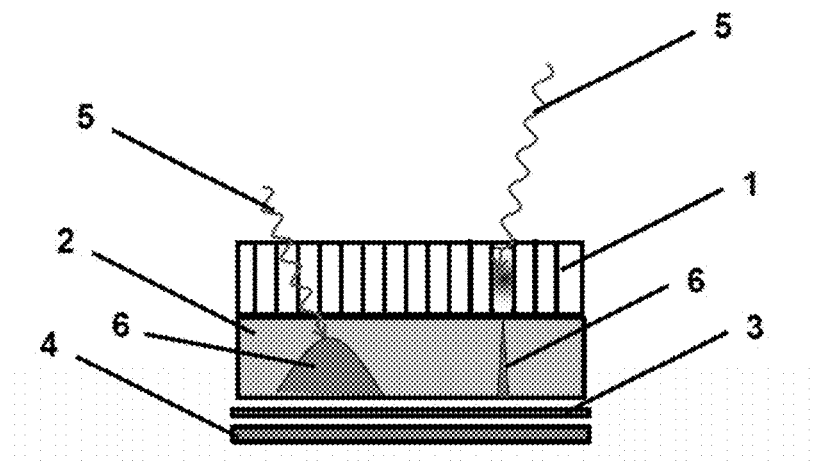
FIG. 6: Simplified representation of scintillation light cones (6) in the first embodiment with radiation, preferably gamma rays (5) converting in both scintillator components.
Figure 7:
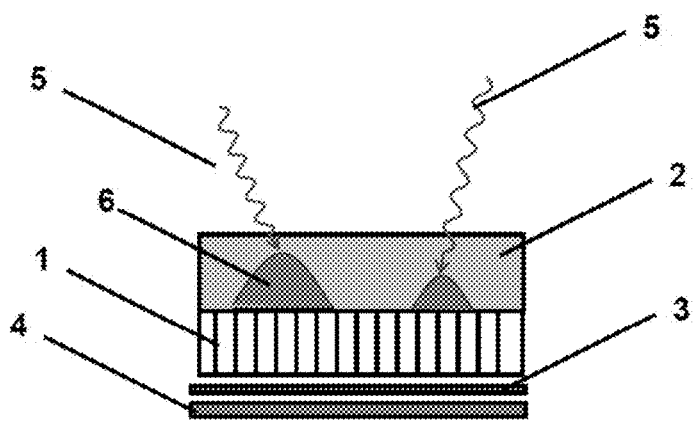
FIG. 7: Simplified representation of scintillation light propagation in the second hybrid module embodiment.
Figure 8:
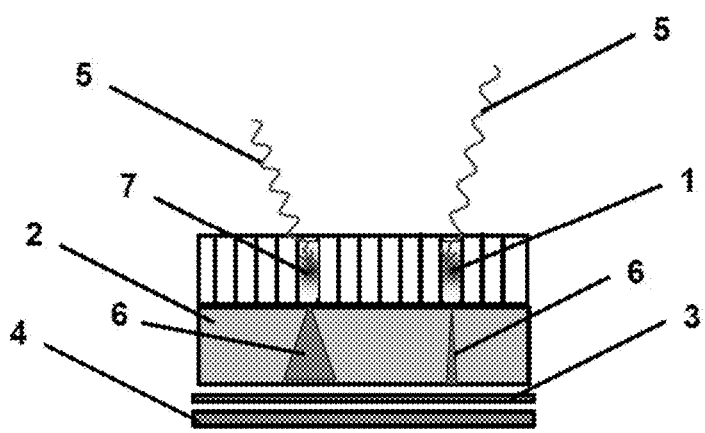
FIG. 8: Sketch of scintillation light propagation mechanism's; in the rough surface pixels (7) it produces wider opening angle scintillation light cone entering into the monolithic scintillator component where it propagates with the same angle opening (in the case of the same scintillator material in both components) until it reaches the multi-element photodetector. The light cone with a larger imprint on the photodetector produces more precise (less image non-uniformity) definition of the centre of gravity of the scintillation light spot and by this it provides better separation of the detection events produced in the neighbouring scintillation pixels.
Figure 9:
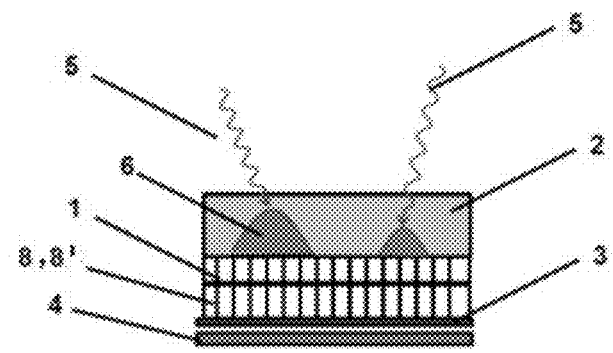
FIG. 9: shows a particular example of the second embodiment in which the pixelated scintillator array (1) is split into two stacked layers, (8') and (8).
Figure 10:
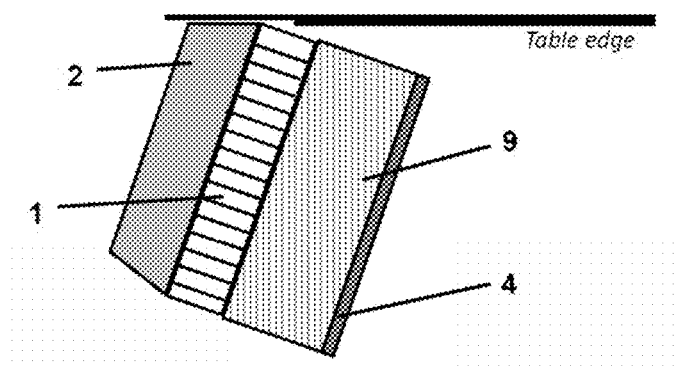
FIG. 10: shows a fiberoptic lightguide (9) that can be used between the scintillator module and the photodetector in some situations requiring stand-off distance between the scintillator and electronics (to minimize mechanical edge effects or to avoid electromagnetic interference).
Figure 11:
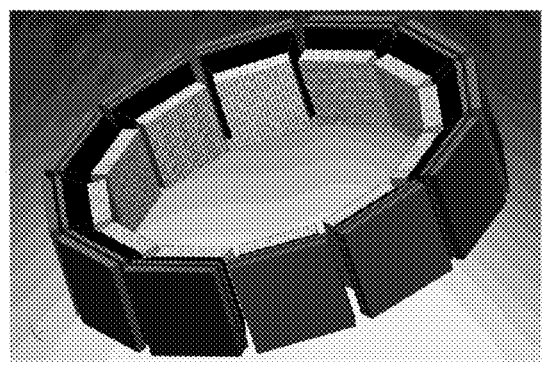
FIG. 11: shows modules arranged in a PET detector ring according to the first embodiment of the scintillation module.

1) Pixel crystal array. A pixel crystal array is a scintillation block made out of many small crystal scintillation crystals-elements, merged (glued) together, typically with all walls and faces polished. The dimensions of each crystal pixel will depend on the resolution goal. The outer dimensions of the pixel array will depend on the selected configuration and system geometry.
2) Monolithic crystal. This is a single, continuous, block of scintillation material. As shown in FIGS. 3-5 the shape of this crystal can vary depending on the chosen configuration. Rectangular and trapezoidal shapes are the most suggested, but others could also be possible.
3) Spreader window or light guide. Spreader windows are typically made out of acrylic or glass material. Their thickness can vary from few tenths of a millimeter to few millimeters.
4) Photodetector. Several types of photodetectors can be employed, such as position sensitive photomultipliers (PSPMTs), photodiodes with and without gain (avalanche photodiodes, APDs), and silicon photomultipliers (SiPMs). Their common feature is that they are position sensitive and provide spatial information on the scintillation light distribution. The preferred option for the photodetector for our concept is array of Silicon Photomultipliers (SiPMs).
5) Impinging rays, preferably gamma rays. The photons, preferably gamma photons, are emitted by the objects that were injected or otherwise inserted mechanically or chemically with the radioactive compounds. In the case of Positron Emission Tomography (PET) typically the positron emitting radolabeled compounds are injected in patients and the emitted annihilation 511 keV photons are emitted from the uptake sites in the patient body. The purpose of the detector modules is to stop and detect these photons, preferably gamma photons. Annihilation photons can come (impinge) at different angles to the front of the detector module. Typically the angle range is within +/−45 deg measured from the vertical to the detector module.
6) Scintillation light distribution, light cones. The scintillation light comes out of the scintillator in a cone-like shape, more regular in the scintillator centre and distorted—compressed at the edges. Measurement of this light distribution to back-calculate the original conversion point of the impinging photon inside the scintillation module is the main purpose of the photodetector and the associated electronics.
7) Pixel crystal where the lateral faces are "as-cut" in contrast to polished.
8) Pixel crystal array with different scintillation material compared to (1).
9) Additional light guide, such as fiberoptic light guide to transport light further away from the scintillator module to minimize edge effects or remove photodetector with front-end electronics further from the object and for example out of the central MRI magnetic and radiofrequency field.

EXAMPLES

Example of the Hybrid Scintillation Module According to the First Embodiment

Figure 12:
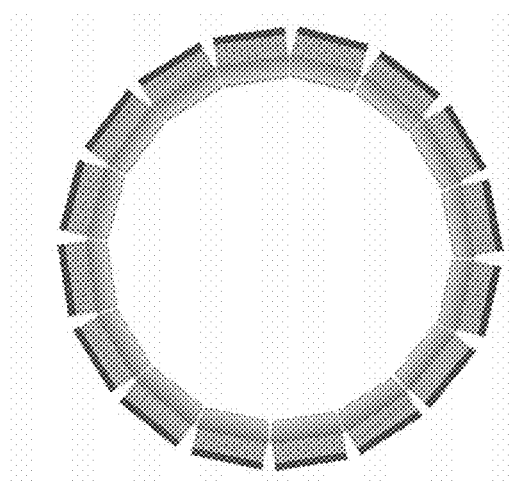
FIG. 12: shows the tapered shape of the monolithic section from FIG. 4 and how it enables higher packing fraction of the modules placed on a ring and how it minimizes the physical gaps between the modules.

According to the first embodiment, the scintillator module comprises a pixelated scintillation array (1), a scintillator plate (2), and can also comprise an additional light guide (3). The whole assembly can be seen in FIGS. 2 and 4, where also the incoming photons (5), preferably gamma photons, and the photodetector based on a SiPM array (4) are shown. FIG. 12 shows a set of modules arranged on a ring forming a PET detector ring, also according to the first embodiment of the scintillator module.

Figure 1:
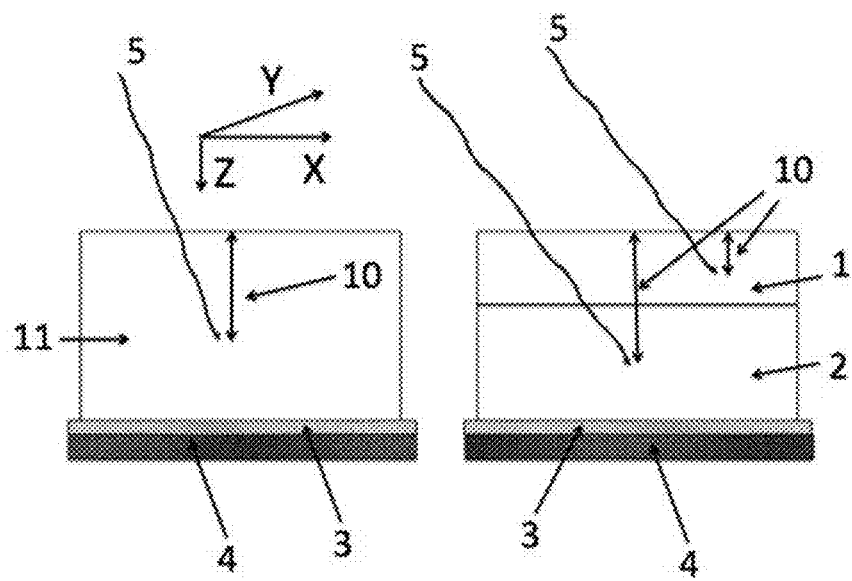
FIG. 1: Concept of the Depth-of-Interaction (DOI) 10 in two generic examples of radiation, preferably gamma, detection modules. Radiation, preferably gamma rays, 5 typically arrive at some angle and interact at the different depths. Light from scintillation module components 1-2 is detected in photodetectors 4. Example of the first preferred embodiment with the pixelated scintillation array(s) placed upfront facing the incident ray, preferably gamma ray beam, and, thus, on top of the monolithic plate(s) with the photodetector on the other side of the monolithic plate and receiving scintillation light from both components of the scintillator module 11. Readout for one component (left) and two-component (right) scintillation module.
Figure 2:
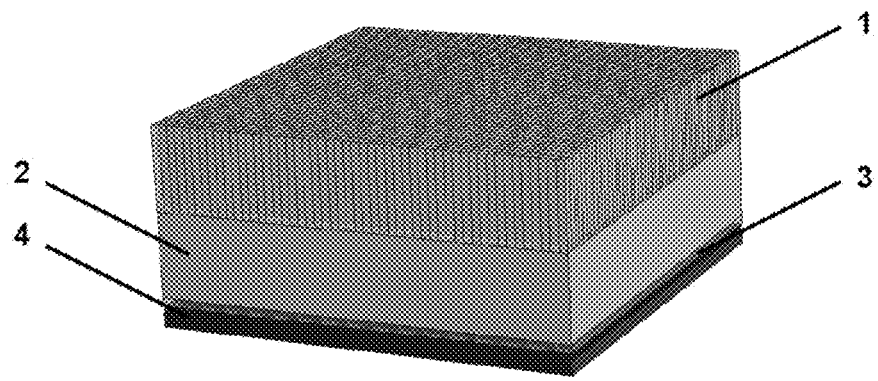
FIG. 2: Particular example of the first embodiment: a pixelated scintillation component in front (1), is followed by the monolithic scintillation component (2), the spreader window or light guide (3) and the photodetector (4).

According to the example of the first preferred embodiment of the hybrid scintillation module as shown in FIGS. 2 and 4, there is a pixelated array on top of the monolithic scintillator. The scintillation light from the array on its way to the photodetector passes through the monolithic crystal acting here as an optical window. At the same time, the monolithic plate scintillator is also functioning as an active material detecting a fraction of the incoming radiation, preferably gamma radiation, that traversed the pixelated array without producing interactions.

Example of the Functioning of the Hybrid Scintillation of the Invention According to the First Embodiment (Reduction to Practice)

Small LYSO array of 1.5 mm step and 10 mm long pixels was placed on top of a 10 mm thick monolithic plate of LYSO scintillator. On the other side of the monolithic plate a Silicon Photomultiplier photodetector was placed composed of a 4×4 array of 3 mm MPPC sensors from Hamamatsu. Na22 source of annihilation 511 keV photons (and 1274 keV gammas) was placed above the LYSO array.

Figure 13:
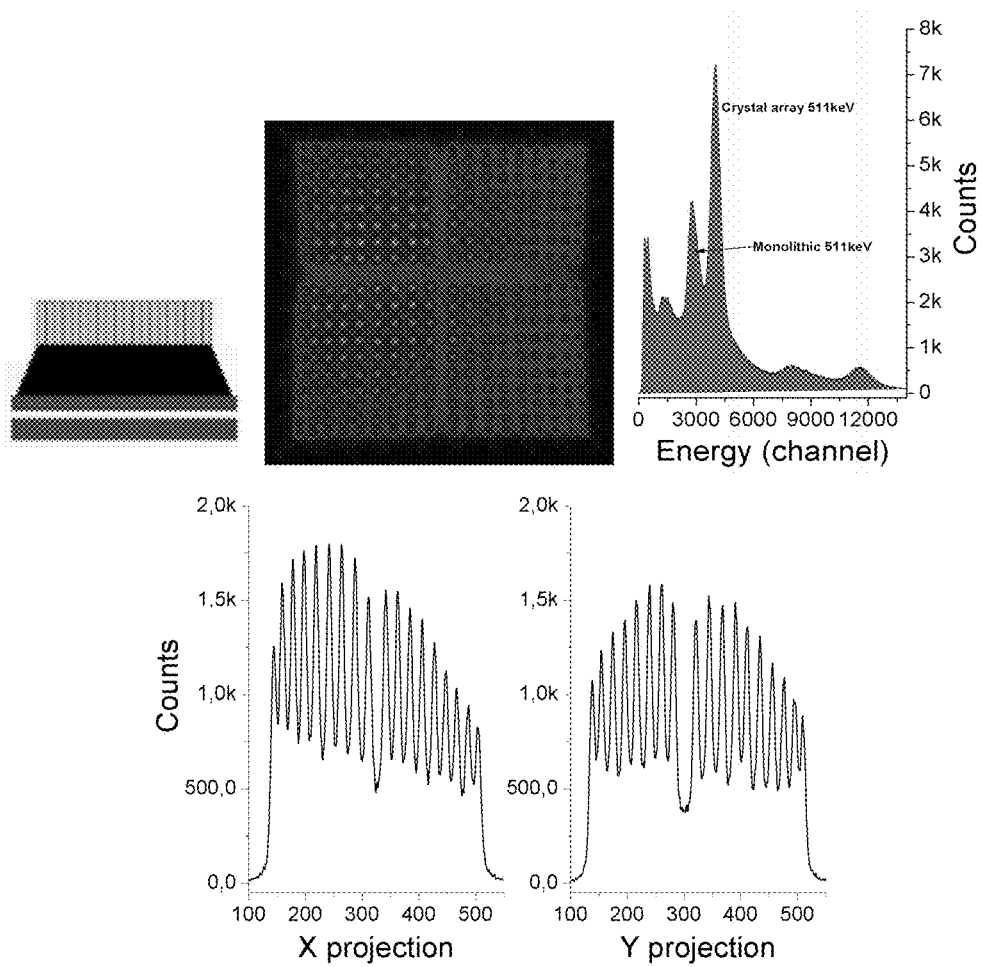
FIG. 13: shows the first reduction to practice of the first preferred embodiment using SensL (Cork, Ireland) Silicon Photomultiplier (SiPM) array. The monolithic in between the crystal array and the photodetector has 12 mm thickness. Top: Sketch, 2D contour plot of the crystal array at 511 keV where most pixels of 2 mm size are shown well separated, and energy spectrum showing both monolithic and pixelated contributions. Bottom: Profiles of one row and one column of the pixelated contribution.
Figure 14:
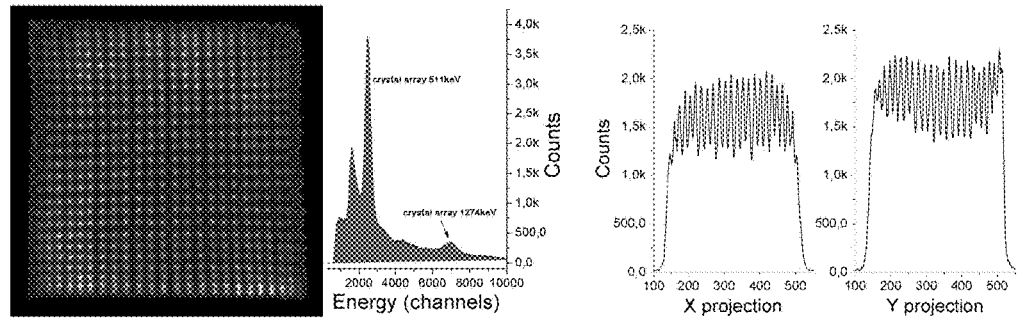
FIG. 14: First reduction to practice as in FIG. 13 but using 1.5 mm×1.5 mm crystal pixels.
Figure 15:
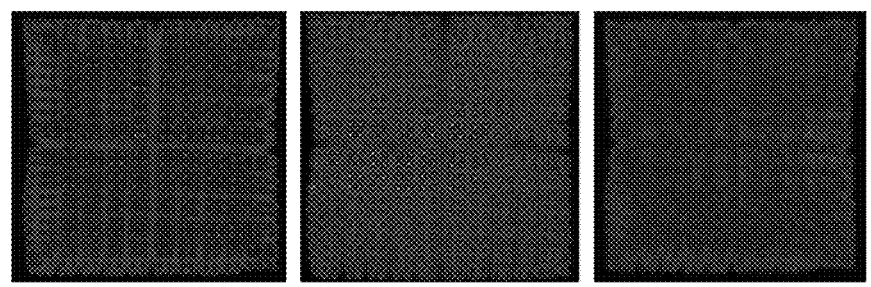
FIG. 15: Second reduction to practice of the second embodiment using SensL SiPM array. Raw image and plot of the section of the detector corresponding to the 2 mm×2 mm×10 mm pixelated LYSO at 511 keV. A 2 mm pitch pixelated LYSO array was inserted between the 12 mm thick monolithic LYSO plate and the SiPM array photodetector. 2 mm pixels are seen very well separated. To enhance the signal from the array, strong F18 radioactive source of annihilation photons was placed at the back of the module, behind the photodetector. Top, from left to right, 2D contour plots for the full energy spectra, 511 keV pixelated contribution and 511 keV monolithic contribution.
Figure 15:
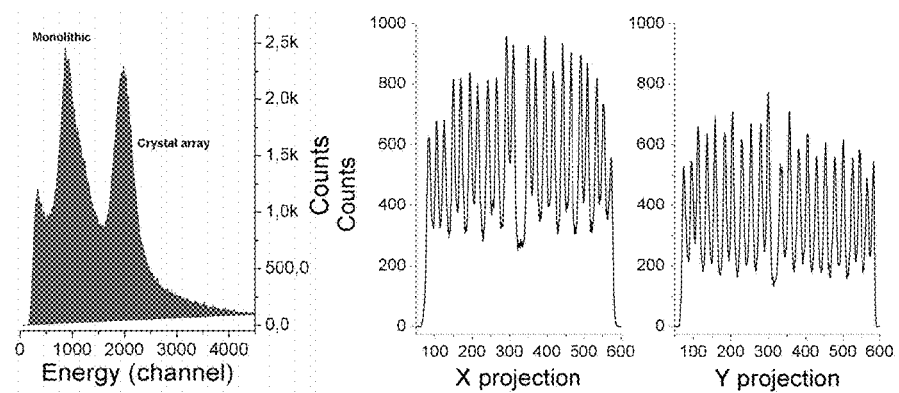
Figure 16:
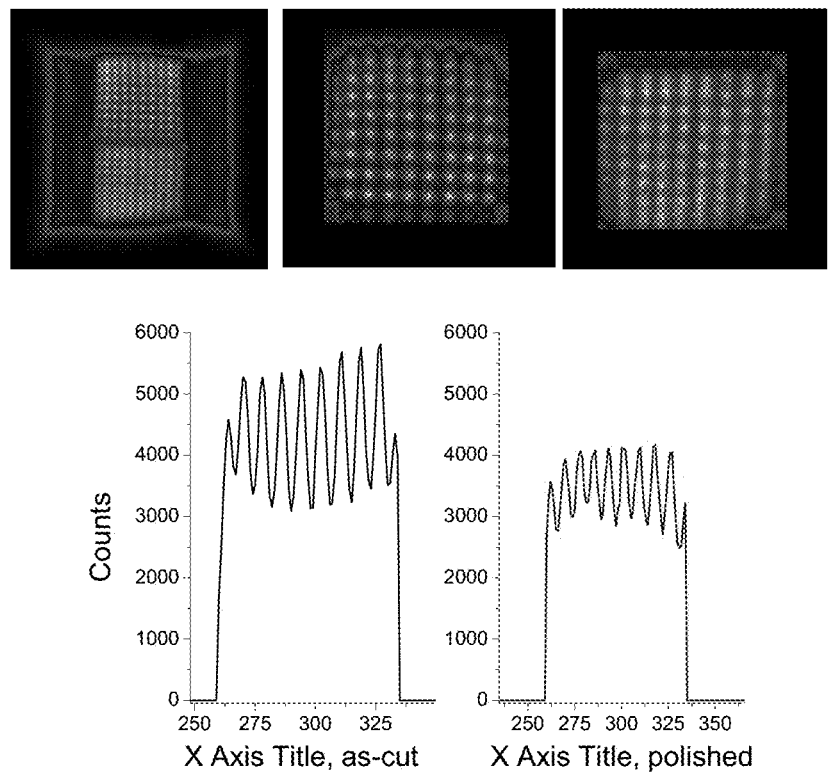
FIG. 16: Demonstration of the importance of surface treatment of the pixelated component of the hybrid scintillator module with the pixelated scintillation array being on top of the monolithic scintillation plate. From two otherwise identical 10×10 LYSO arrays of 1.5×1.5×10 mm pixels from Proteus, one had side walls of the "as-cut" quality, while the second had all sides polished. The one with "as-cut" surfaces had about factor two higher signal response in the MPPC (Multi-Pixel Photon Counter) photodetector and the individual pixels were distinguished in the raw image (center) while in the all-sides-polished case the pixels were not separated (right) even at a higher energy of 1274 keV. In this measurement the LYSO plate of 12 mm was used demonstrating the limitation of the hybrid approach with greater scintillator thickness. (Measurement was performed at temperature of 22 degrees C.).
Figure 17:
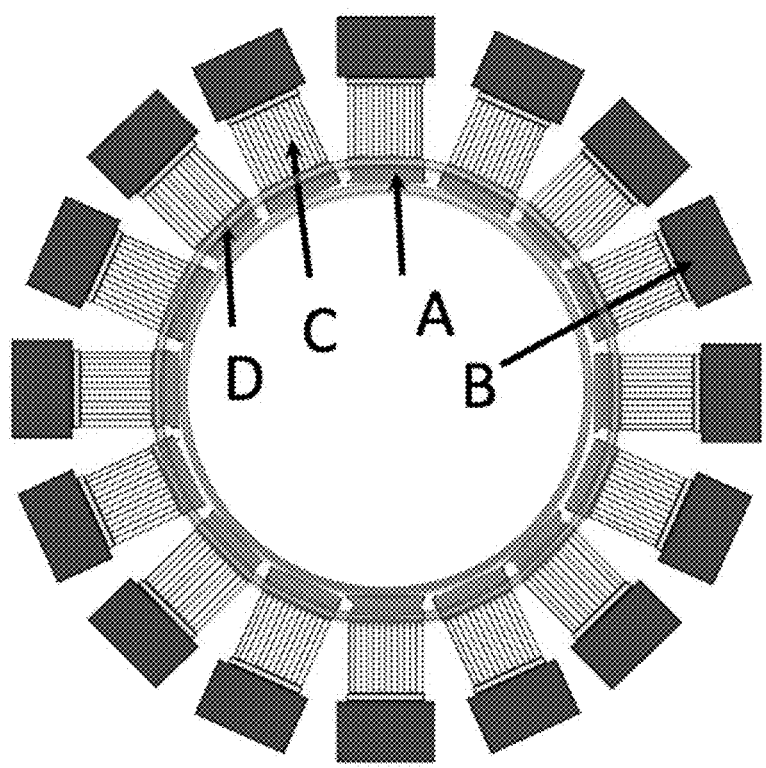
FIG. 17. Generic drawing of a ring of modules showing scintillation blocks A (one or many layers) coupled to the photodetector modules with electronics B, through the fiberoptic light guides C. The fiberoptic light guides built from arranged arrays of fibers or individual optical channels are image-preserving and their purpose is to transport in parallel fashion scintillation light as it is emerging from the scintillation module, to the photodetector placed at the other end of the light guide. Implementation of the fiberoptic light guide provides stand-off distance between the scintillator modules and the photodetector modules and in typical situations will minimize the dead regions—breaks between the scintillation modules. Considering the application of the PET insert in MRI, a relatively thin additional optical window may be inserted between the scintillator and the fiberoptic lightguide, that can also serve as a component of the RF shield D between the photodetector/electronics modules and the RF field of the MRI. This window will be based on special materials that provide RF shield and are optically transparent to the scintillation light.

FIGS. 13 and 14 show examples of operation of the embodiment from FIGS. 2 and 4. They show the first reduction to practice of the first preferred embodiment using SensL SiPM array. At the top raw, images of the two components of the hybrid scintillator can be seen, both at 511 keV: 1.6 mm pitch pixelated LYSO array coupled in front of the 12 mm thick monolithic LYSO plate. 1.5 mm pixels are seen well separated. At the bottom one can see only the image obtained at 511 keV from the pixelated component, plus the profile through one pixel row. Most pixels are shown well separated.

The plot shows the raw image obtained at the energy of 511 keV, clearly indicating that the individual LYSO pixels are well separated in the image. In addition, an example of the individual energy spectrum obtained from one of the 1.5 mm×1.5 mm×10 mm LYSO pixels is shown at right. After correcting for the energy non-linearity present when using the special diode based 4 ch charge division readout (from AiT Instruments), the energy resolution of ~16% FWHM @ 511 keV is extracted from the data. While not yet optimized, the pilot results clearly demonstrate that the concept of the array-monolithic hybrid scintillator works.

Example of the Second Embodiment

Figure 18:
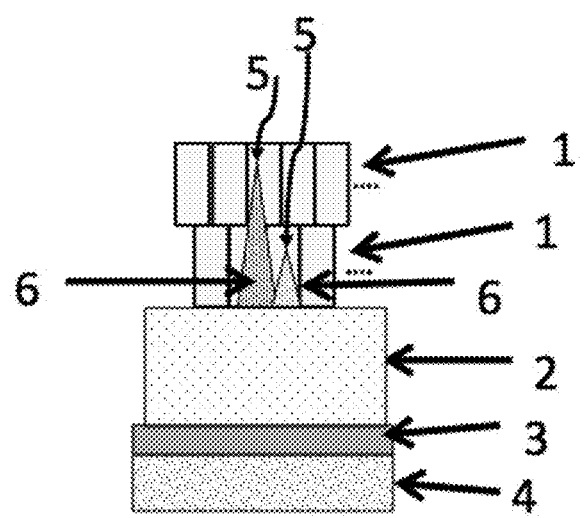
FIG. 18 shows an example of a scintillator module structure with the pixelated array 1 split into two pixelated arrays placed on top of each other and shifted sideways, and then coupled to the monolithic scintillator plate 2. Scintillation light from the top pixelated array propagates into bottom pixelated array and then continues into the scintillation plate 2 and to the photodetector 4 via lightguide 3. The scintillation light cones 6 from the two sub-arrays are shifted relatively to each other at the photodetector surface and this allows to differentiate the gamma interactions in the top array from the interactions in the bottom array.

FIGS. 3 and 5 show an example of the second preferred embodiment. The pixelated scintillation array performs two functions: fiberoptic light guide for the top plate scintillator and additional scintillator layer to increase light stopping power for incoming radiation, preferably gamma, for the scintillation module. The pixelated scintillation array could be further vertically split into a stack of two or even more shifted arrays to improve DOI resolution of the detector module, as illustrated in FIG. 18. With the pixelated scintillation array as a stack of two shifted arrays on top of each other, typically both arrays will have the same pixel pitch and the shift is half a pitch in both X-Y planar coordinates. FIG. 5 shows a variant with the scintillator plate in front having a tapered shape to (1) minimize the optical edge effects in the continuous scintillator component and to (2) minimize the physical gaps between the detector modules when placed in a ring.

REFERENCES

1. Mikiko Ito, Seong Jong Hong and Jae Sung Lee, Positron Emission Tomography (PET) Detectors with Depth-of-Interaction (DOI) Capability, Biomed Eng Lett (2011) 1:70-81. DOI 10.1007/s13534-011-0019-6
2. Jae Sung Lee, Technical Advances in Current PET and Hybrid Imaging Systems, The Open Nuclear Medicine Journal, 2010, 2, 192-20.
3. Thomas K. Lewellen, The Challenge of Detector Designs for PET, AJR 2010; 195:301-309.
4. Hao Peng and Craig S. Levin, Recent Developments in PET Instrumentation, Current Pharmaceutical Biotechnology, 2010, 11, 555-571.
5. Craig S. Levin, New Imaging Technologies to Enhance the Molecular Sensitivity of Positron Emission Tomography, Proceedings of the IEEE, Vol. 96, No. 3, March 2008, 439-467.

What is claimed is:

1. A hybrid scintillation module for the detection of radiation, said hybrid scintillation module comprising:
at least a first pixelated scintillation array (1) with a multiplicity of scintillators wherein said pixelated scintillation array is configured to have a stack of at least two arrays that are shifted sideways relative to each other so as to differentiate gamma interactions in an upper array in said stack from gamma interactions in a bottom array in said stack;
at least a first monolithic scintillation plate (2) and wherein said first monolithic scintillation plate is configured to have a trapezoidal shape; and
wherein said pixelated scintillation array (1) comprises a first face configured to receive incident radiation and a second face, opposite said first face, against which said at least first monolithic scintillation plate (2) is positioned.

2. The hybrid scintillation module according to claim 1, wherein the monolithic scintillation plate (2) is split into at least two stacked layers (8).

3. The hybrid scintillation module according to claim 1, that further comprises at least a light spreader window.

4. The hybrid scintillation module according to claim 1, that further comprises at least a refractive optical coupling compound which has a refractive index n, within the range 1.4<n<1.8.

5. The hybrid scintillation module according to claim 1, wherein the monolithic scintillation plate (2) and the pixelated scintillation array is made of the same scintillation material or of different scintillation materials.

6. The hybrid scintillation module, according to claim 1 that comprises a pixelated scintillation array (1) in front of a monolithic scintillation plate, wherein the thickness of the pixelated scintillation arrays (1) is lower than the thickness of the monolithic scintillation plate (2).

7. The hybrid scintillation module according to claim 1 wherein the scintillation array is rough-cut.

8. The hybrid scintillation module, according to claim 1 wherein the radiation is gamma radiation.

9. A hybrid scintillation device, comprising a hybrid scintillation module for the detection of radiation, said hybrid scintillation module comprising:
at least a first pixelated scintillation array (1) with a multiplicity of scintillators wherein said pixelated scintillation array is configured to have a stack of at least two arrays that are shifted sideways relative to each other so as improve depth of interaction (DOI) resolution in said hybrid scintillation module;
at least a first monolithic scintillation plate (2) and at least a photodetector (4) and wherein said first monolithic scintillation plate is configured to have a trapezoidal shape; and
wherein said pixelated scintillation array (1) comprises a first face configured to receive incident radiation and a second face, opposite said first face, against which said at least first monolithic scintillation plate (2) is positioned.

10. The hybrid scintillation device according to claim 9 further comprising means for extracting 3D information on the position of the radiation conversion event from the planar 2D distribution of the scintillation light cone at the photodetector surface.

11. The hybrid scintillation device according claim 10, wherein said means are a 3D spatial differentiation algorithm that extracts the 3D information on the position of the radiation conversion event from the planar 2D distribution of the scintillation light cone at the photodetector surface.

12. The hybrid scintillation device, according to claim 9 wherein the radiation is gamma radiation.

13. The hybrid scintillation device, according to claim 9 that further comprises fiberoptic lightguide (9) between the hybrid scintillation module and the photodetector (4) to transport light further away from the scintillators.

14. A method to obtain images from a radiation emitting object in nuclear medicine comprising:

disposing a hybrid scintillation module which comprises a combination of:
  at least a first pixelated scintillation array (1) with a multiplicity of scintillators, wherein said pixelated scintillation array is configured to have a stack of at least two arrays that are shifted sideways relative to each other so as to differentiate gamma interactions in an upper array in said stack from gamma interactions in a bottom array in said stack; and
  at least a first monolithic scintillation plate (2) and wherein said first monolithic scintillation plate is configured to have a trapezoidal shape;
  wherein said pixelated scintillation array (1) comprises a first face configured to receive incident radiation and a second face, opposite said first face, against which said at least first monolithic scintillation plate (2) is positioned;
detecting the emitted radiation by said at least first pixelated scintillation array (1) with said multiplicity of scintillators, and in said at least first monolithic scintillation plate (2) of said hybrid scintillation module and generating said images.

15. The method according to claim 14 wherein the nuclear medicine imaging technique is selected between Single-Photon Emission Computed Tomography, SPECT and Positron Emission Tomography, PET.

16. The method according to claim 14 comprising building a gamma or PET detector built out of one to many such hybrid scintillation modules to obtain radiation emission images from an emitting object, the modules operating as single units or sets of single units, and being arranged in a ring(s) or in planar arrays.

17. The method according to claim 16
wherein the thickness of said pixelated scintillation array (1) is lower than the thickness of said monolithic scintillation plate (2) and wherein said step of generating said images comprises producing three images as follows:
  one image corresponding to a high resolution detector with a first resolution level below the full resolution detector, that produces a high resolution image with a first resolution level below the full resolution,
  a moderate resolution second image with a second resolution level below the first resolution level, produced by a moderate resolution detector with a second resolution level below the first resolution level
  and a full resolution image produced by the full module resolution by combining the mentioned high resolution image and the moderate resolution second image.

18. A method to obtain images from a radiation emitting object in nuclear medicine comprising:
disposing a hybrid scintillation device comprising:
  a hybrid scintillation module comprising a combination of:
    at least a first pixelated scintillation array (1) with a multiplicity of scintillators, wherein said pixelated scintillation array is configured to have a stack of at least two arrays that are shifted sideways relative to each other so as to improve depth of interaction (DOI) resolution in said hybrid scintillation module; and
    at least a first monolithic scintillation plate (2) and wherein said first monolithic scintillation plate is configured to have a trapezoidal shape;
    wherein said pixelated scintillation array (1)) comprises a first face configured to receive incident radiation and a second face, opposite said first face, against which said at least first monolithic scintillation plate (2) is positioned;
  and
  at least a photodetector (4); and
detecting the emitted radiation by the at least first pixelated scintillation array (1) with said multiplicity of scintillators, and in the at least first monolithic scintillation plate (2) of the hybrid scintillation module; and generating said images.

19. The method according to claim 18 wherein the nuclear medicine imaging technique is selected between Single-Photon Emission Computed Tomography, SPECT and Positron Emission Tomography, PET.

20. The method according to claim 18 comprising building a gamma or PET detector built out of one to many such hybrid scintillation modules to obtain radiation emission images from an emitting object, the modules operating as single units or sets of single units, and being arranged in a ring(s) or in planar arrays.

21. The method according to claim 20
wherein the thickness of the pixelated scintillation array (1) is lower than the thickness of the monolithic scintillation plate (2) and wherein said step of generating said images comprises producing three images as follows:
  one image corresponding to a high resolution detector with a first resolution level below the full resolution detector, that produces a high resolution image with a first resolution level below the full resolution,
  a moderate resolution second image produced by a moderate resolution detector with a second resolution level below the first resolution level,
  and a full resolution image produced by the full module resolution by combining the mentioned high resolution image and the moderate resolution second image.

* * * * *